United States Patent [19]

Cunningham

[11] 4,341,422
[45] Jul. 27, 1982

[54] RESTRAINT DEVICE

[75] Inventor: Douglas J. Cunningham, Lutterworth, England

[73] Assignee: B.S.G. International Limited, Birmingham, England

[21] Appl. No.: 157,947

[22] Filed: Jun. 9, 1980

[30] Foreign Application Priority Data

Jun. 9, 1979 [GB] United Kingdom ............... 7920164

[51] Int. Cl.³ .................. B60R 21/00; A47C 31/00
[52] U.S. Cl. .................................. 297/488; 297/391; 297/464
[58] Field of Search ............... 297/464, 487, 488, 216, 297/391, 118; 280/743, 748, 751

[56] References Cited

U.S. PATENT DOCUMENTS

| 1,368,466 | 2/1921 | Tyler | 297/484 |
| 3,713,695 | 1/1973 | Von Wimmersperg | 297/488 |
| 3,934,898 | 1/1976 | Long | 297/488 |
| 4,114,948 | 9/1978 | Perkey | 297/391 X |
| 4,230,366 | 10/1980 | Ruda | 297/487 |

FOREIGN PATENT DOCUMENTS

| 1008155 | 2/1952 | France . | |
| 2309375 | 11/1976 | France | 297/488 |
| 2351821 | 12/1977 | France . | |
| 1480012 | 7/1977 | United Kingdom . | |
| 1528781 | 10/1978 | United Kingdom . | |

Primary Examiner—James T. McCall
Attorney, Agent, or Firm—Kemon & Estabrook

[57] ABSTRACT

A child restraint, of the type comprising a pad adapted to fit between an adult lap safety belt and the abdomen of a child, can alternatively be used as an adult head restraint. When used as a child restraint, the pad is held in place by an adult lap safety belt. When used as an adult head restraint, the pad is secured to fixtures at the top of the seat back, the front surfaces of the device being suitably shaped. When used as a child restraint, webs of webbing extend from the top of the seat back to respective sides of the pad, so as to provide lateral restraint.

7 Claims, 1 Drawing Figure

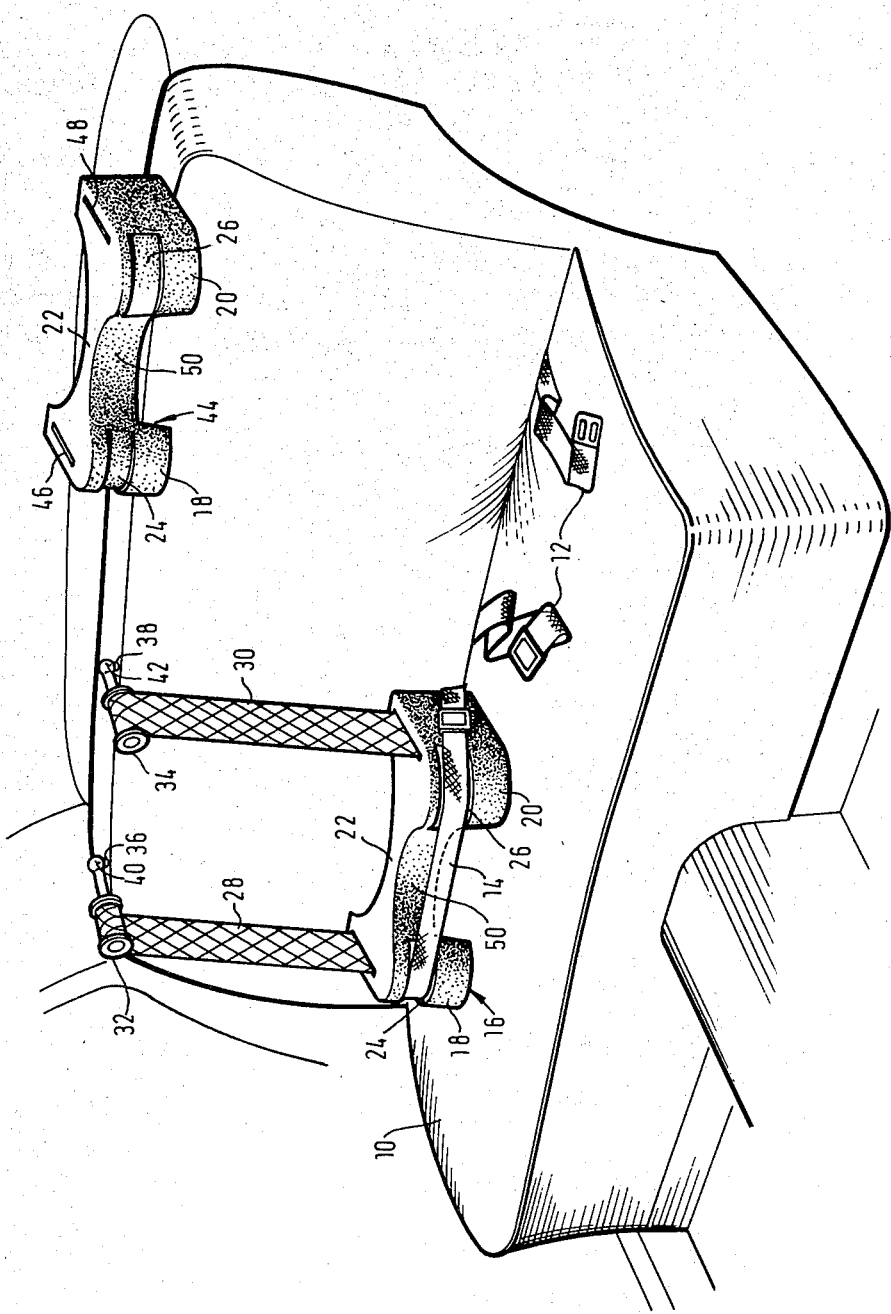

RESTRAINT DEVICE

This invention relates to a restraint device for safeguarding a child in the rear seat of a vehicle in the event of the vehicle being involved in an accident.

U.K. Specification No. 1,444,500 discloses a restraint device of the foregoing type comprising a pad shaped to fit over and around the thighs and abdomen of a child seated in a vehicle seat, the pad, in use, being located between the child and a lap safety belt, the pad being formed of lastingly deformable rigid foam and being structurally weakened, at least in a forward facing zone about which the lap belt engages, so as to collapse under predetermined loading. Thus, this device enables a child to be restrained by means of an adult safety belt.

It is also known to provide a vehicle seat with a head restraint which is pivotally mounted on a pair of arms, one an each side of the head restraint, so that, when the seat is occupied by a child, the head restraints can be pivoted downwardly and forwardly so as to be disposed in front of the child with one of the arms on each side. The padded head restraint then serves to restrain forward movement of the child in the event that the vehicle is involved in an accident. However, this arrangement suffers from the disadvantage that it is difficult to release the child from the restraint quickly unless a relatively complex emergency release mechanism is provided. Moreover, neither of the foregoing restraint devices is suitable for use by a child who is too young to be able to sit in a motor vehicle without lateral support. Between the ages of about 9 months and about 3 years, a child can safely adopt a sitting position in a motor vehicle only if lateral movement of its head and shoulders is restrained, for example during cornering.

The present invention provides a restraint device comprising a pad shaped to fit over and around the thighs and abdomen of a child seated in a vehicle seat, guide means on the pad for engagement with an adult lap safety belt to hold the pad in position between a child and said safety belt for use as a child restraint, and means for securing the pad in an alternative position above the top of the seat back to serve as an adult head restraint.

The present invention also provides a restraint device comprising a pad shaped to fit over and around the thighs and abdomen of a child seated in a vehicle seat, guide means on the pad for engagement with an adult lap safety belt to hold the pad in position between a child and said safety belt for use as a child restraint and respective webs of a flexible material such as netting extend from attachment points adjacent to the top of the seat back to respective sides of the pad.

These webs serve a dual purpose. Firstly, if the vehicle is subject to a side impact, they serve to restrain lateral movement of the upper part of the child's body relative to the seat. Secondly, if the vehicle is subject to rapid deceleration due to a frontal impact and, as the child moves forwards against the pad, there is some forward movement to the latter due to stretching of the adult belt and/or deformation of the part of the pad in contact with the belt, the connection provided by the webs to the region at the top of the seat back will cause the pad to move upwardly as well as forwardly so as to improve its position for restraining the upper part of the child's body. The means for attaching the upper ends of the webs may comprise retractor reels incorporated in the means for securing the pad in said alternative position in which it serves as an adult head restraint.

An embodiment of the invention will be described, by way of example, with reference to the accompanying drawing which is a perspective view of the rear seat of a motor car fitted with two restraint devices in accordance with the invention, one deployed for use as a child restraint and the other for use as an adult head restraint.

In the drawing, a rear seat 10 of a motor vehicle is equipped with two adult lap safety belts 12 and 14. The belt 14 is illustrated as securing a child restraint device in the form of a one-piece pad 16 of lastingly deformable rigid foam having two side portions 18 and 20 resting on the seat and interconnected at the front by a bridge portion 22 adapted to fit in front of the abdomen and over the thighs of a child sitting on the seat 10. The adult belt 14 engages in channels 24 and 26 formed in the side portions 18 and 20 so as to hold it in the position illustrated.

Attached to the upper surfaces of the side portions 18 and 20 are respective webs 28 and 30 of netting. The upper ends of the webs 28 and 30 are connected to retractor reels 32 and 34 which are mounted on respective pillars 36 and 38. The reels 32 and 34 are connected to the corresponding pillars 36 and 38 by pivot points 40 and 42 which allow the reels to move between the substantially horizontally, forwardly-extending position illustrated and the vertical position in which the reel axes are substantially aligned with the pillars 36 and 38.

On the other side of the seat, to which the belt 12 is fitted, another pad 44 is located above the top of the seat back. The pad 44 is identical with the pad 14 and similar reference numerals are therefore used for the various parts thereof which will not be described in detail. The pad 44 is mounted with its retractor reels 32 and 34 received in recesses (not shown) therein, such reels having been pivoted into their vertical position. Most of the webs 28 and 30 have been wound on to the reels and the ends thereof have been withdrawn through slots 46 and 48 which communicate with the recesses in which the reels 32 and 34 are received. The design of these recesses is such that horizontal movement of the pad 44 is inhibited. The front surface of the pad 44 is shaped as shown at 50 so as to serve as an adult head restraint.

Alternatively the retractor reels 32 and 34 may be replaced by retractor reels housed in recesses in the pad 16. In this case, the tops of the webs 28 and 30 are secured to respective attachment points at the locations of the pillars 36 and 38, such attachment points including means for securing the pad 16 in its head restraint position.

I claim:

1. A restraint device for use with a vehicle seat comprising a pad shaped to fit over and around the thighs and abdomen of a child seated in the vehicle seat, guide means on the pad for engagement with an adult lap safety belt to hold the pad in position between a child and said safety belt, and a pair of webs of flexible material each extending from a respective attachment point adjacent to the top of the seat back to a respective side of the pad.

2. A restraint device according to claim 1, wherein the webs are formed of netting.

3. A restraint device according to claim 1, further comprising means for securing the pad in an alternative position above the top of the seat back to serve as an adult head restraint.

4. For use with a vehicle seat, an adult lap safety belt and a restraint device comprising a pad shaped to fit over and around the thighs and abdomen of a child seated in the vehicle seat, means for securing the pad in an alternative position above the top of the seat back to serve as an adult head restraint and guide means on the pad for engagement with the adult lap safety belt, whereby when the pad is positioned over and around the thighs and abdomen of said seated child, the pad is held in position when the safety belt is fastened and the pad is movable forwardly relative to the seat when the safety belt is released.

5. A restraint device according to claim 3, further comprising retractor reels for storing the webs when the pad is positioned for use as an adult head restraint.

6. A restraint device according to claim 5, wherein the retractor reels are incorporated in the means for securing the pad in said alternative position in which it serves as an adult head restraint.

7. A restraint device according to claim 5, wherein the retractor reels are located within the pad.

* * * * *